US012574841B2

(12) United States Patent
Vandikas et al.

(10) Patent No.: US 12,574,841 B2
(45) Date of Patent: Mar. 10, 2026

(54) ADJUSTING POWER CONSUMPTION IN A TELECOMMUNICATIONS NETWORK BASED ON TRAFFIC PREDICTION

(71) Applicant: Telefonaktiebolaget LM Ericsson (publ), Stockholm (SE)

(72) Inventors: Konstantinos Vandikas, Solna (SE); Lackis Eleftheriadis, Valbo (SE); Alexandros Nikou, Stockholm (SE); Yifei Jin, Solna (SE); Ioannis Fikouras, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 516 days.

(21) Appl. No.: 17/920,178

(22) PCT Filed: May 28, 2020

(86) PCT No.: PCT/EP2020/064916
§ 371 (c)(1),
(2) Date: Oct. 20, 2022

(87) PCT Pub. No.: WO2021/239238
PCT Pub. Date: Dec. 2, 2021

(65) Prior Publication Data
US 2023/0180123 A1 Jun. 8, 2023

(51) Int. Cl.
H04W 52/02 (2009.01)
H04W 16/22 (2009.01)
(Continued)

(52) U.S. Cl.
CPC ....... H04W 52/0206 (2013.01); H04W 16/22 (2013.01); H04W 24/02 (2013.01); H04W 28/0221 (2013.01); Y02D 30/70 (2020.08)

(58) Field of Classification Search
CPC . H04W 52/0206; H04W 16/22; H04W 24/02; H04W 28/0221; H04W 72/542; H04W 24/10; H04W 16/28; Y02D 30/70
See application file for complete search history.

(56) References Cited

U.S. PATENT DOCUMENTS

| | | | | |
|---|---|---|---|---|
| 11,495,124 B2 * | 11/2022 | Lau | ...................... | G06T 19/006 |
| 12,177,748 B2 * | 12/2024 | Ali | .......................... | H04W 4/80 |
| 2014/0114490 A1 * | 4/2014 | Zhou | ................. | H04W 52/0206 |
| | | | | 700/291 |

FOREIGN PATENT DOCUMENTS

| | | |
|---|---|---|
| CN | 103430602 A | 12/2013 |
| CN | 108848520 A | 11/2018 |

(Continued)

OTHER PUBLICATIONS

International Search Report and Written Opinion for PCT Application No. PCT/EP2020/064916, mailed Feb. 12, 2021, 19 pages.

(Continued)

*Primary Examiner* — Chandrahas B Patel
(74) *Attorney, Agent, or Firm* — Sage Patent Group

(57) ABSTRACT

A method of operating a radio network node to adjust power consumption of a telecommunications network is provided. The method includes determining a traffic prediction representing how each node of a set of nodes will interact with the radio network node over a period of time using a combined traffic model based on a traffic model of each node in the set of nodes. The method further includes determining to enable or disable at least one power related feature of the radio network node based on the traffic prediction.

19 Claims, 10 Drawing Sheets

(51) Int. Cl.
H04W 24/02 (2009.01)
H04W 28/02 (2009.01)

(56) References Cited

FOREIGN PATENT DOCUMENTS

| EP | 2672748 A1 | 12/2013 |
| EP | 3439352 A1 | 2/2019 |
| WO | 2016078268 A1 | 5/2016 |
| WO | 2018006925 A1 | 1/2018 |

OTHER PUBLICATIONS

Blume, et al. "Energy Savings in Mobile Networks Based on Adaptation to Traffic Statistics," Bell Labs Technical Journal 15(2), Mar. 2010, Wiley, California, 18 pages.
"HetNet mobility and DRX with background traffic," Nokia Corporation, Nokia Siemens Networks, 3GPP TSG-RAN WG2 Meeting #77bis, R2-121164, Jeju, S. Korea, Mar. 26-30, 2012, 10 pages.
First Office Action, Chinese Patent Application No. 202080101352. X, mailed Oct. 25, 2024, 12 pages.

* cited by examiner

| | |
|---|---|
| pmPdcpVolDlDrb | The total volume (PDCP SDU) on Data Radio Bearers that has been transferred (UM and AM) in the downlink direction. |
| pmPdcpVolDlSrb | The total number of bits (PDCP SDU) on Signalling Radio Bearers that has been transferred (acknowledged by the UE) in the downlink direction. |
| pmPdcpVolDlDrbQci | The total volume (PDCP SDU) that has been transferred (UM and AM) on Data Radio Bearers in the downlink direction per QCI. |
| pmPdcpVolUlDrb | The total volume (PDCP SDU) on Data Radio Bearers that has been received in the uplink direction and transmitted over the GTP-U. |
| pmPdcpVolUlSrb | The total number of bits (PDCP SDU) on Signalling Radio Bearers that has been transferred (acknowledged by the RBS) in the uplink direction. |
| pmPdcpVolUlDrbQci | The total volume (PDCP SDU) that has been received on Data Radio Bearers in the uplink direction per QCI. |
| pmRrcConnEstabSucc | The total number of successful RRC Connection Establishments |

Determine a traffic prediction representing how each node of a set of nodes interacts with a radio network node using a combined traffic model

1050

Determine to enable or disable at least one power related feature of the radio network node based on the traffic prediction

1060

Determine a set of nodes

1110

---

Transmit a request message to each node of the set of nodes, each request message requesting a traffic model be generated

1120

---

Receive a response message from each node of the set of nodes

1130

---

Generate a combined traffic model based on the traffic model from each node of the set of nodes

1140

---

Determine a traffic prediction representing how each node of the set of nodes interacts with a radio network node using the combined traffic model

1050

---

Determine to enable or disable at least one power related feature of the radio network node based on the traffic prediction

1060

---

Cause the state of the radio network node to transition between an active state and a sleep state

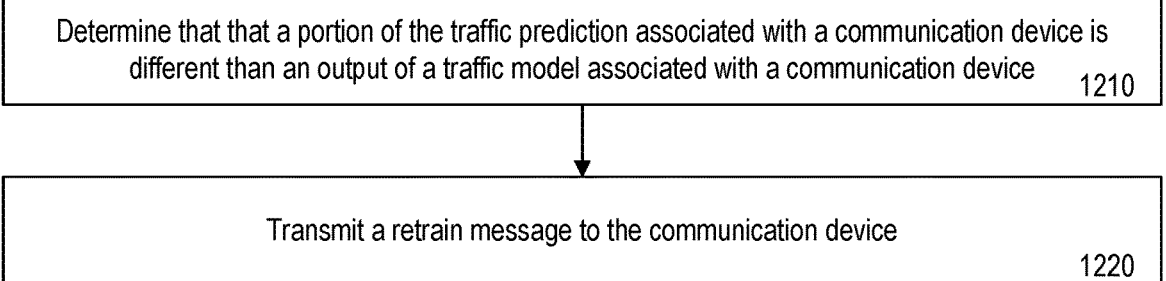

Determine that that a portion of the traffic prediction associated with a communication device is different than an output of a traffic model associated with a communication device

1210

---

Transmit a retrain message to the communication device

Receive a request to generate and provide a traffic model to a radio network node
1310

Generate the traffic model
1330

Transmit the traffic model to the radio network node
1340

Receive a request to generate and provide a traffic model to a radio network node

1310

Measure the communication feature

1420

Generate the traffic model

1330

Transmit the traffic model to the radio network node

1340

Receive a request to retrain the traffic model

1450

Retrain the traffic model

1460

Transmit the retrained traffic model to the radio network node

1470

ADJUSTING POWER CONSUMPTION IN A TELECOMMUNICATIONS NETWORK BASED ON TRAFFIC PREDICTION

CROSS REFERENCE TO RELATED APPLICATIONS

This application is a 35 U.S.C. § 371 national stage application of PCT International Application No. PCT/EP2020/064916 filed on May 28, 2020, the disclosure and content of which is incorporated by reference herein in its entirety.

TECHNICAL FIELD

The present disclosure relates generally to communications and more particularly to a method of operating a radio network node to adjust power consumption of a telecommunications network.

BACKGROUND

Modern telecommunication networks starting from 4G and upwards are designed with energy efficiency in mind. Consequently, different generations are implementing features such as discontinuous reception ("DRX"), which is a micro-sleep technique performed by a radio network node that reduces power consumption. For example, a radio network node can keep a cell in a dormant state and only wake the cell when there is a threshold amount of information to be transmitted and/or received via the cell. Micro sleep can happen almost instantaneously and can be hard for a communication device (also referred to herein as a user equipment ("UE")) connected to the radio network node to notice any kind of delay. Even though these techniques for adjusting power consumption features are available, they are not commonly used because it is possible, under certain circumstances, to break service layer agreements such as latency and throughput and even produce poor quality of service for certain users. There remains a need for improving energy efficiency in telecommunications networks.

SUMMARY

According to some embodiments, a method of operating a radio network node to adjust power consumption of a telecommunications network is provided. The method includes determining a traffic prediction representing how each node of a set of nodes will interact with the radio network node over a period of time using a combined traffic model based on a traffic model of each node in the set of nodes. The method further includes determining to enable or disable at least one power related feature of the radio network node based on the traffic prediction.

One potential advantage is that energy savings may be obtained by more accurately predicting traffic via decentralized modeling of traffic between a radio network node and the most frequently connected UEs. Other potential advantages may include allowing the use of energy saving techniques (e.g., DRX) while maintaining service layer agreements and a high quality of service for all users. Other potential advantages that may be achieved include improved prediction of traffic using a UE power class.

According to other embodiments, a radio network node in a telecommunications network is provided. The radio network node includes processing circuitry and memory coupled with the processing circuitry. The memory includes instructions that when executed by the processing circuitry causes the radio network node to perform operations to adjust power consumption of the telecommunications network. The operations include determining a traffic prediction representing how each node of a set of nodes will interact with the radio network node over a period of time using a combined traffic model based on a traffic model of each node in the set of nodes. The operations further include determining to enable or disable at least one power related feature of the radio network node based on the traffic prediction.

According to other embodiments, a radio network node in a telecommunications network that is adapted to perform operations to adjust power consumption of the telecommunications network is provided. The operations include determining a traffic prediction representing how each node of a set of nodes will interact with the radio network node over a period of time using a combined traffic model based on a traffic model of each node in the set of nodes. The operations further include determining to enable or disable at least one power related feature of the radio network node based on the traffic prediction.

According to other embodiments, a computer program is provided. The computer program includes program code to be executed by processing circuitry of a radio network node in a telecommunications network, whereby execution of the program code causes the radio network node to perform operations to adjust power consumption of the telecommunications network. The operations include determining a traffic prediction representing how each node of a set of nodes will interact with the radio network node over a period of time using a combined traffic model based on a traffic model of each node in the set of nodes. The operations further include determining to enable or disable at least one power related feature of the radio network node based on the traffic prediction.

According to other embodiments, a computer program product is provided. The computer program product includes a non-transitory storage medium including program code to be executed by processing circuitry of a radio network node in a telecommunications network, whereby execution of the program code causes the radio network node to perform operations to adjust power consumption of the telecommunications network. The operations include determining a traffic prediction representing how each node of a set of nodes will interact with the radio network node over a period of time using a combined traffic model based on a traffic model of each node in the set of nodes. The operations further include determining to enable or disable at least one power related feature of the radio network node based on the traffic prediction.

According to other embodiments, a method of operating a communication device in a telecommunication network to adjust power consumption of the telecommunications network is provided. The method including receiving, a request message from a radio network node operating in the telecommunication network. The request message can request the communication device generate and provide a traffic model to the radio network node. The method can further include, responsive to receiving the request message, generating the traffic model. The method can further include, responsive to generating the traffic model, transmitting a response message to the radio network node, the response message including the traffic model.

According to other embodiments, a communication device in a telecommunications network is provided. The communication device includes processing circuitry and memory coupled with the processing circuitry. The memory includes instructions that when executed by the processing circuitry causes the communication device to perform operations to adjust power consumption of the telecommunications network. The operations include receiving, a request message from a radio network node operating in the telecommunication network. The request message can request the communication device generate and provide a traffic model to the radio network node. The operations can further include, responsive to receiving the request message, generating the traffic model. The operations can further include, responsive to generating the traffic model, transmitting a response message to the radio network node, the response message including the traffic model.

According to other embodiments, a communication device in a telecommunications network that is adapted to perform operations to adjust power consumption of the telecommunications network is provided. The operations include receiving, a request message from a radio network node operating in the telecommunication network. The request message can request the communication device generate and provide a traffic model to the radio network node. The operations can further include, responsive to receiving the request message, generating the traffic model. The operations can further include, responsive to generating the traffic model, transmitting a response message to the radio network node, the response message including the traffic model.

According to other embodiments, a computer program is provided. The computer program includes program code to be executed by processing circuitry of a communication device in a telecommunications network, whereby execution of the program code causes the communication device to perform operations to adjust power consumption of the telecommunications network. The operations include receiving, a request message from a radio network node operating in the telecommunication network. The request message can request the communication device generate and provide a traffic model to the radio network node. The operations can further include, responsive to receiving the request message, generating the traffic model. The operations can further include, responsive to generating the traffic model, transmitting a response message to the radio network node, the response message including the traffic model.

According to other embodiments, a computer program product is provided. The computer program product includes a non-transitory storage medium including program code to be executed by processing circuitry of a communication device in a telecommunications network, whereby execution of the program code causes the communication device to perform operations to adjust power consumption of the telecommunications network. The operations include receiving, a request message from a radio network node operating in the telecommunication network. The request message can request the communication device generate and provide a traffic model to the radio network node. The operations can further include, responsive to receiving the request message, generating the traffic model. The operations can further include, responsive to generating the traffic model, transmitting a response message to the radio network node, the response message including the traffic model.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 5 is a table illustrating an example of performance manager ("PM") counters in accordance with some embodiments;

FIG. 9 is a block diagram illustrating an example of a core network ("CN") node in accordance with some embodiments;

FIGS. 10-12 are flow charts illustrating examples of processes performed by a network node in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

In some examples, techniques for adjusting power consumption (e.g., DRX) can allow service layer agreements such as latency and throughput to be broken and produce poor quality of service for certain users. This can be due to the fact that the techniques for adjusting power consumption only take into consideration the amount of information that is available at the cell (and other cells associated with the same radio network node), which can be insufficient to predict cases where, due to handovers there is traffic from faraway cells (including cells at neighboring radio network nodes) that are about to be transferred. Such transfers can catch a cell in an idle or sleep state.

Various embodiments described herein may overcome these problems by enabling a radio network node to make more accurate predictions about the amount of traffic that it will receive.

Figures 1, 2:
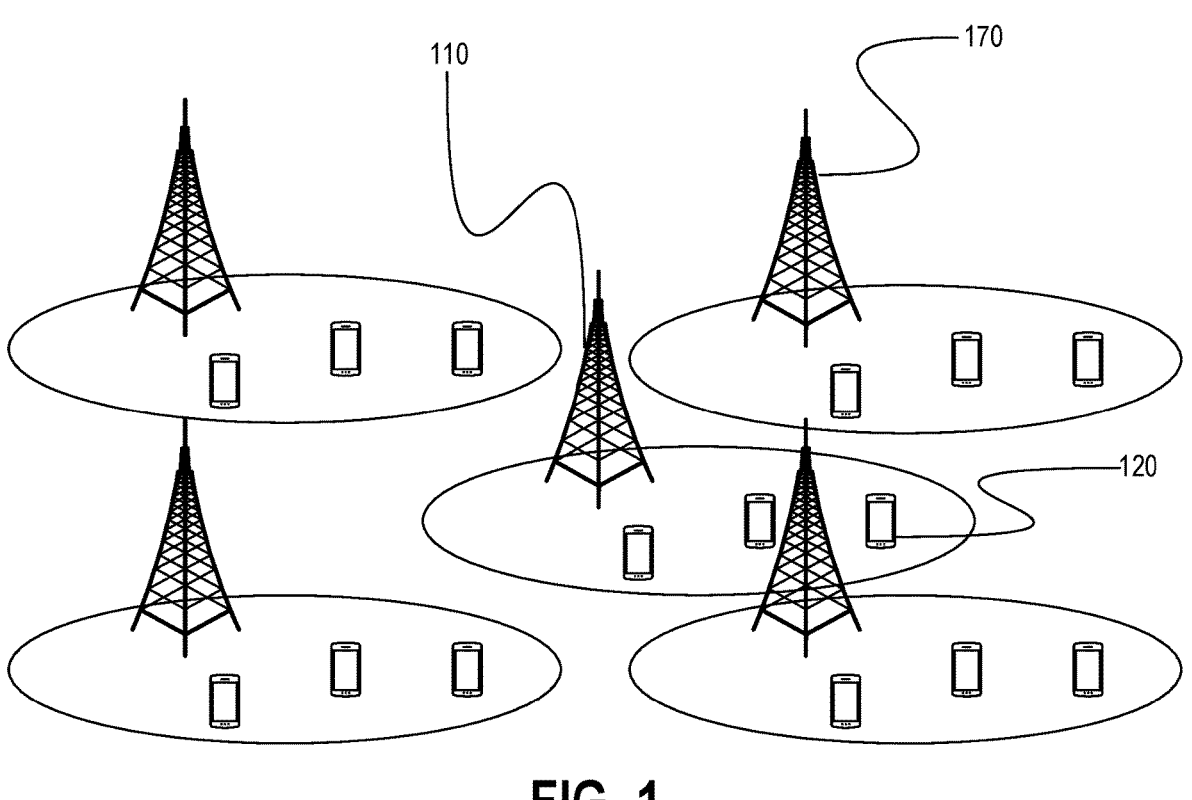
FIG. 1 is a schematic diagram illustrating an example of a telecommunications network.
FIG. 2 is a graph illustrating an example of traffic distribution on a radio network node during a twenty-four hour period.

FIG. 1 illustrates an example of a 5th Generation ("5G") telecommunication network including a next generation nodeB ("gNodeB" or "gNB") 110, UEs 120, and neighboring gNBs 170. In some embodiments, the gNB 110 is able to make more accurate predictions about future traffic by generating a combined traffic model based on traffic models generated by UEs 120 within a coverage area of the gNB 110. In some examples, the combined traffic model and/or traffic models generated by each UE 120 can be based on information associated with a UE's power class, and/or features of a connection between the UE 120 and the gNB 110. In additional or alternative examples, the gNB 110 is able to make more accurate predictions about future traffic by generating the combined traffic model based on traffic models generated by neighboring gNBs 170. In some examples, the neighboring gNBs 170 can generate traffic models based on predicted uplink/downlink traffic that will be handed over between the gNB 110 and the neighboring gNBs 170.

Although FIG. 1 depicts a 5G or new radio, NR, network, some embodiments described herein are not limited to newer generations of radio network nodes and can be applied to older generations such as 3$^{rd}$ Generation ("3G") or long-term evolution ("LTE") networks and radio network nodes. In some examples, when a radio network node is active, there can be a function that is called micro sleep transmission ("TX") that enables power savings by turning off the power amplifier ("PA") when there is no data on the frames, to be transmitted out from the PA. The function can turn off the PA for a short period of time to save power. Execution of a micro sleep TX can highly depend on which radio access technology ("RAT") is being used and the different RAT transmission patterns. For example, the RATs have different modulation schemes for operating and controlling the PA in different way based on the frame structure.

In global system for mobile communication ("GSM") the transitions may be based on frame structure and divided into different timeslots. For example, the specific frame time may be fixed to 4.6 ms. If there is empty transmission of data=null (no transmission of data), the PA can be turned "OFF" and power saved using a micro sleep function, during the transmissions of frames. Long term evolution ("LTE") is also based on a frame structure and the minimum time frame can be fixed to 1 ms. Accordingly, the PA can be turned "OFF" if no data exist, within the time frame using a micro sleep function. New radio ("NR") frame structure is based on LTE, with the difference being that NR also has variable numerology and can go down to times as 62.5 us. Still, the PA can be turned "OFF" if no data exist, within the time frame, using the micro sleep function.

Figure 7:
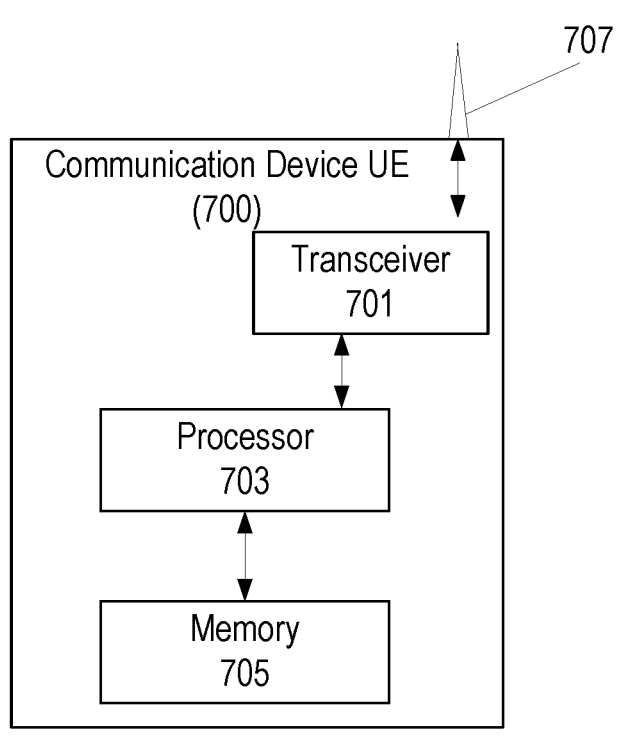
FIG. 7 is a block diagram illustrating an example of a communication device in accordance with some embodiments.

FIG. 7 is a block diagram illustrating elements of a communication device (also referred to as a user equipment ("UE")) 700 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device 700 may include an antenna 707, and transceiver circuitry 701 (also referred to as a transceiver) including a transmitter and a receiver configured to provide uplink and downlink radio communications with a base station(s) (also referred to as a RAN node) of a radio access network. Communication device 700 may also include processing circuitry 703 (also referred to as a processor) coupled to the transceiver circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that separate memory circuitry is not required. Communication device 700 may also include an interface (such as a user interface) coupled with processing circuitry 703, and/or communication device 700 may be incorporated in a vehicle.

As discussed herein, operations of communication device 700 may be performed by processing circuitry 703 and/or transceiver circuitry 701. For example, processing circuitry 703 may control transceiver circuitry 701 to transmit communications through transceiver circuitry 701 over a radio interface to a radio access network node (also referred to as a base station) and/or to receive communications through transceiver circuitry 701 from a RAN node over a radio interface. Moreover, modules may be stored in memory circuitry 705, and these modules may provide instructions so that when instructions of a module are executed by processing circuitry 703, processing circuitry 703 performs respective operations.

Figure 8:
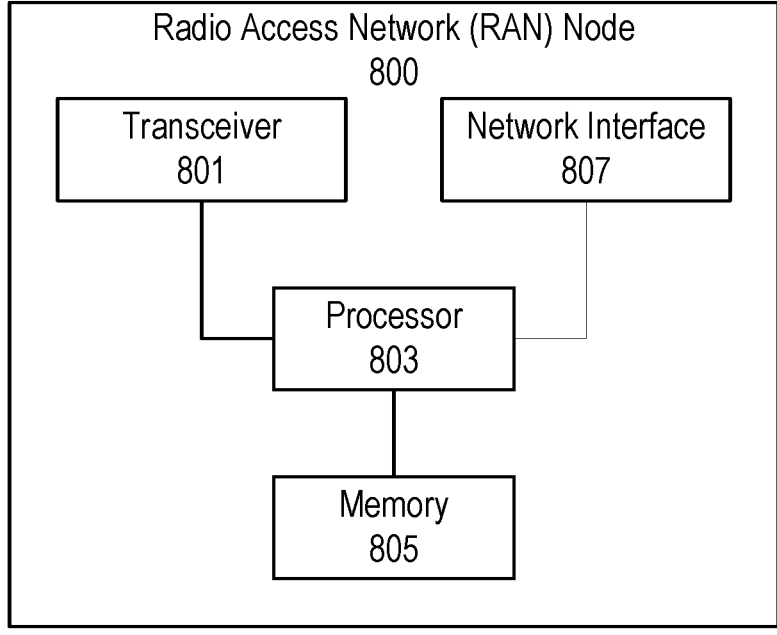
FIG. 8 is a block diagram illustrating an example of a radio access network ("RAN") node in accordance with some embodiments.

FIG. 8 is a block diagram illustrating elements of a radio access network RAN node 800 (also referred to as a network node, base station, eNodeB/eNB, gNodeB/gNB, etc.) of a Radio Access Network (RAN) configured to provide cellular communication according to embodiments of inventive concepts. As shown, the RAN node 800 may include transceiver circuitry 801 (also referred to as a transceiver) including a transmitter and a receiver configured to provide uplink and downlink radio communications with mobile terminals. The RAN node 800 may include network interface circuitry 807 (also referred to as a network interface) configured to provide communications with other nodes (e.g., with other base stations) of the RAN and/or core network CN. The RAN node 800 may also include processing circuitry 803 (also referred to as a processor) coupled to the transceiver circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the RAN node 800 may be performed by processing circuitry 803, network interface 807, and/or transceiver 801. For example, processing circuitry 803 may control transceiver 801 to transmit downlink communications through transceiver 801 over a radio interface to one or more mobile terminals UEs and/or to receive uplink communications through transceiver 801 from one or more mobile terminals UEs over a radio interface. Similarly, processing circuitry 803 may control network interface 807 to transmit communications through network interface 807 to one or more other network nodes and/or to receive communications through network interface from one or more other network nodes. Moreover, modules may be stored in memory 805, and these modules may provide instructions so that when instructions of a module are executed by processing circuitry 803, processing circuitry 803 performs respective operations.

According to some other embodiments, a network node may be implemented as a core network CN node without a transceiver. In such embodiments, transmission to a wireless communication device may be initiated by the network node so that transmission to the wireless communication device is provided through a network node including a transceiver (e.g., through a base station or RAN node). According to embodiments where the network node is a RAN node including a transceiver, initiating transmission may include transmitting through the transceiver.

Figures 9, 10:
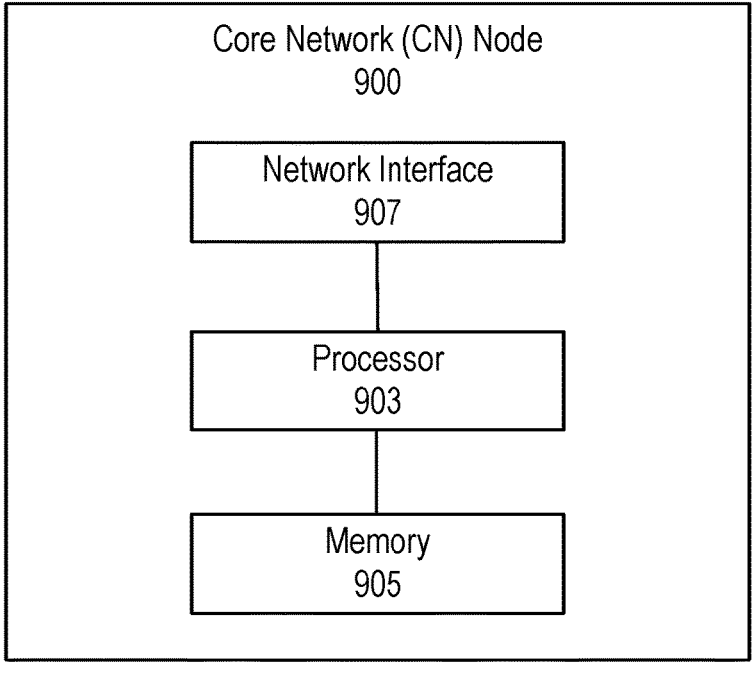

FIG. 9 is a block diagram illustrating elements of a core network CN node 900 (e.g., an SMF node, an AMF node, etc.) of a communication network configured to provide cellular communication according to embodiments of inventive concepts. As shown, the CN node 900 may include network interface circuitry 907 (also referred to as a network interface) configured to provide communications with other nodes of the core network and/or the RAN. The CN node 900 may also include a processing circuitry 903 (also referred to as a processor) coupled to the network interface circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the CN node 900 may be performed by processing circuitry 903 and/or network interface circuitry 907. For example, processing circuitry 903 may control network interface circuitry 907 to transmit communications through network interface circuitry 907 to one or more other network nodes and/or to receive communications through network interface circuitry from one or more other network nodes. Moreover, modules may be stored in memory 905, and these modules may provide instructions so that when instructions of a module are executed by processing circuitry 903, processing circuitry 903 performs respective operations.

A main consumer of gNodeBs resources are UEs, whose usage pattern can be difficult to measure and predict due to privacy related implications. Accordingly, some traffic models are based on information that is "local" to each cell of a radio network node. These locally based traffic models can be inaccurate since the traffic models may not accurately predict handovers and transfers of data from other cells associated with the radio network node and/or neighboring radio network nodes, which can be common if a UE is mobile.

Various embodiments described herein use decentralized learning between a radio network node (or a cell of the radio network node) and the UEs that most frequently connect to the radio network node to learn how the UEs are interacting with the radio network node over time and consequently formulate traffic patterns. Based on these traffic patterns, the radio network node can enable/disable different power related features to improve power efficiency while maintaining quality of service for users.

FIG. 2 illustrates an example of traffic distribution on a radio network node during a 24-hour period. In some examples, the traffic pattern can predict the traffic distribution including long periods of inactivity during which a UE may be using other means of data transfers (e.g., a WIFI access point). The radio network node may reduce power consumption by entering a sleep state during these predicted long periods of inactivity.

In some embodiments, UEs collaborate (e.g., federate) to produce a combined model about traffic prediction. For example, the model is federated between different devices and combined (e.g., averaged) at the radio network device (e.g., a gNB). Each UE can generate and provide a traffic model that predicts uplink and downlink volume that will be produced by the UE for the radio network node. In some examples, the traffic model is generated based on inputs that can be referred to as feature-space or communication features associated with a connection between a UE and a radio network node. These communication features can include the UE's location, it's distance from the radio network node (or a cell associated with the radio network node), measured reference signal received power/reference signal received quality ("RSRP/RSRQ") for the connection with the radio network node (which may indicate if the UE has good connectivity) and the measured amount of bits (per time unit) that are sent and received. A cap may be applied to the data being input to the model, for example, the data may be limited to only the most frequently connected cells and not every cell that the UE visits. This can generate a regression problem, which can be implemented using an long short term memory ("LSTM") neural network.

Figure 3:
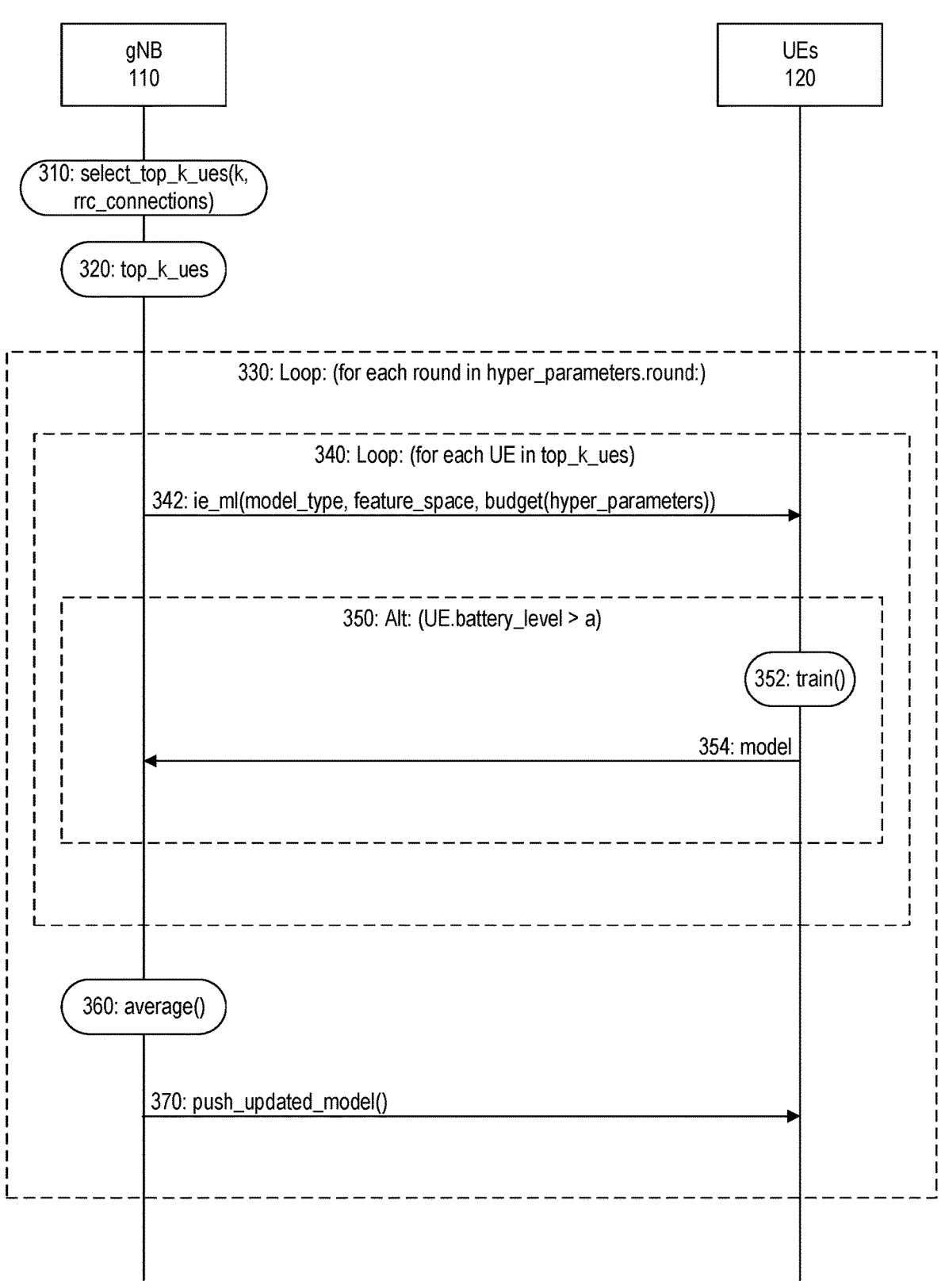
FIG. 3 is a signal flow diagram illustrating an example of a process using traffic models from multiple UEs to generate a combined traffic model in accordance with some embodiments.

FIG. 3 illustrates an example of a process performed by the gNB 110 of FIG. 1 to adjust power consumption based on traffic models generated by UEs 120. The sequence of operations provide an example of how the gNB 110 combines traffic models trained by each of multiple UEs 120 into a combined traffic model, and provides the combined traffic model to each of the UEs. In this example, each UE 120 is assumed to have enough capacity and samples to train a traffic model (e.g., a neural network). In alternative examples, some UEs may transmit a response message that indicates they are unable to generate and provide a traffic model.

At operation 310, the gNB 110 determines a set of UEs 120. In some examples, the set of UEs 120 are selected based on historical data from the UEs within a coverage area of the gNB 110 that most frequently connect to the gNB. Operation 320 identifies the determined set of UEs 120. Operation 330 is a loop encompassing operations 340, 342, 350, 352, 354, 360, and 370, which indicates these operations are performed for a predetermined number of rounds determined by the number of UEs 120 identified in operation 320. For each round in operation 330, gNB 110 identifies hyper_parameters for the training at each UE 120. The hyper_paramaters can include, without limitation, different parameters related to the traffic model to be trained at each UE 120. For example, if the traffic model is a neural network, hyper_parameters can include, without limitation, the number of layers included in the neural network, an amount of time within which each of the UEs 120 is to train the neural network, etc. In another example, if the traffic model is a random tree, the hyper_parameters can include, without limitation, a depth of the random tree for each of the identified UEs 120, etc.

Still referring to FIG. 3, operation 340 is a loop encompassing operations 342, 350, 352, and 354, which indicates that these operations are performed for each UE identified in operation 320. At operation 342, gNB 110 transmits a message (here, ie_ml) to a specific UE of the identified UEs 120. The message includes a request to train a traffic model provided by gNB 110, and provide the trained traffic model to the gNB 110. In this example, the message further includes, the model to be trained (e.g., model type in the example of FIG. 3), and features and parameters related to the model to be trained (e.g., feature_space and budget (hyper_parameters) as illustrated in the example of FIG. 3). The feature_space can indicate features that the gNB 110 wants to learn from the identified UEs 120 and that will be inputs to the traffic model. The feature_space can indicate a communication feature to be measured and input to the traffic model. For example, feature_space can indicate that the UE should measure: a location of the UE; a distance of the UE from the gNB; a reference signal received power ("RSRP"); a reference signal received quality ("RSRQ"); an amount of bits per a time unit sent or received by the UE; and/or a signal to noise ratio ("SNR"); and input the communication feature into the traffic model.

Operation 350 is a loop that includes operations 352 and 354, which indicates these operations are performed as long as the corresponding UE's 120 battery level stays above a threshold level. At operation 352, the UE trains the traffic model in response to the message received in operation 342. At operation 354, the UE transmits the trained traffic model to the gNB 110.

At operation 360, the gNB 110 averages each of the traffic models received from the UEs 120 to generate a combined traffic model. At operation 370, the gNB 110 transmits the combined traffic model to the UEs 120.

In some embodiments, after the operations in FIG. 3, the gNB 110 proceeds with enabling/disabling a DRX feature or adjusting transmission/reception power based on the combined traffic model.

Figure 4:
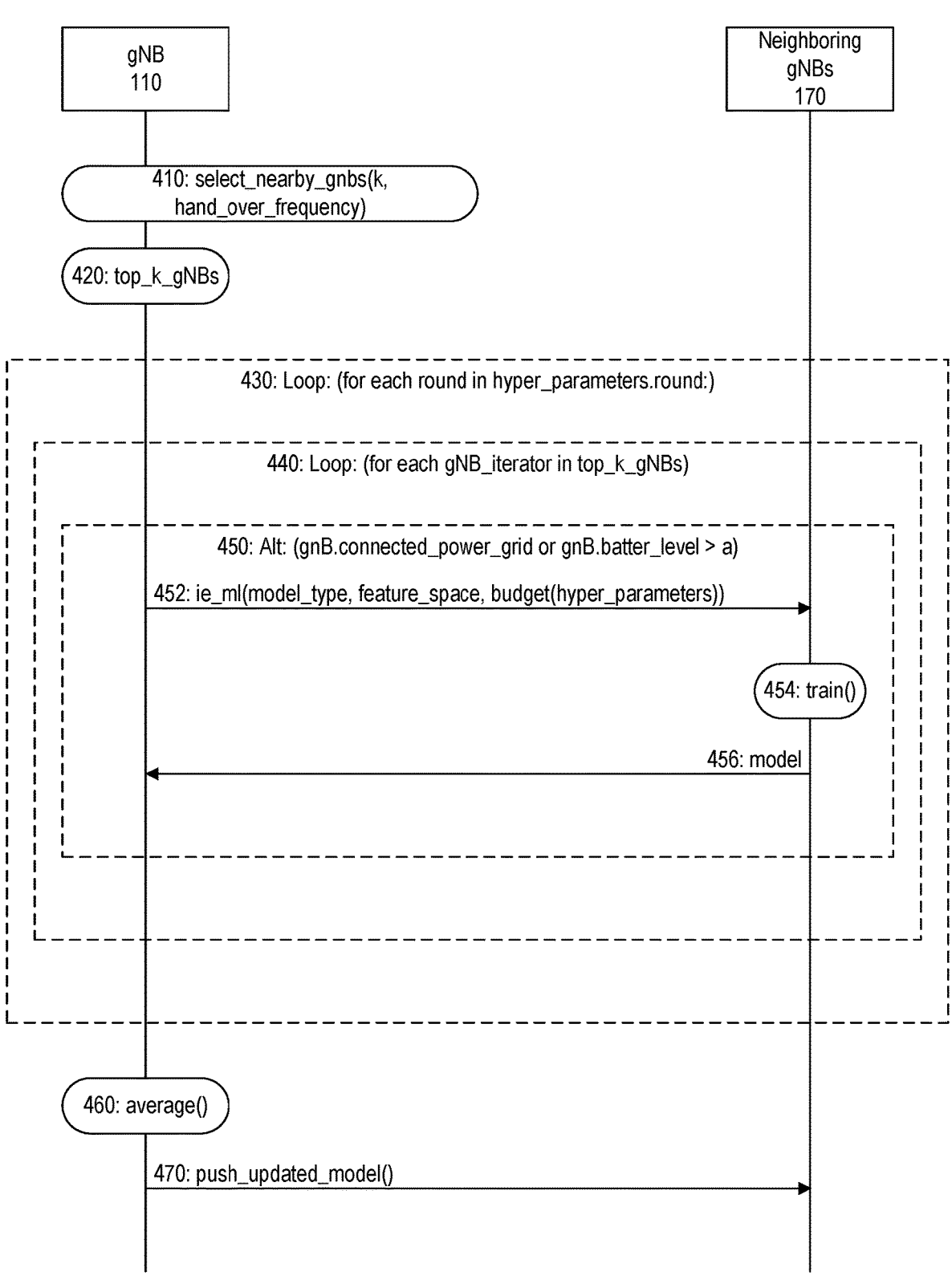
FIG. 4 is a signal flow diagram illustrating an example of a process using traffic models from multiple neighboring radio network nodes in accordance with some embodiments.

FIG. 4 illustrates an example of a process performed by a gNB to check in advance if access to the power grid is available or not. This can be particularly important if a gNB is deployed in an unreliable power grid network. If the gNB 110 does not have access to the power gird, the decentralized modeling may only proceed if the gNB's alternative power supply can provide sufficient power for the process.

At operation 410, gNB 110 determines a set of neighboring gNBs 170. Operation 420 identifies the determined set of neighboring gNBs 170. In some examples, the set of neighboring gNBs 170 are selected as the neighboring gNBs that most frequently perform a handover with the gNB 110. Operation 430 is a loop encompassing operations 440, 450, 452, 454, 456, 458, and 460, which indicates these operations will be performed a predetermined number of times determined by the number of gNBs 170 identified in operation 420. In some examples, each loop of 430 can be performed in parallel or serially. For each round in operation 430, gNB 110 identifies hyper_parameters for the training at each gNB 170. The hyper_paramaters can include, without limitation, different parameters related to the traffic model to be trained at each gNB 170. For example, if the traffic model is a neural network, hyper_parameters can include, without limitation, the number of layers included in the neural network, an amount of time within which each of the gNB170 is to train the neural network, etc. In another example, if the traffic model is a random tree, the hyper_parameters can include, without limitation, a depth of the random tree for each of the identified gNBs 170, etc.

Still referring to FIG. 4, operation 440 is a loop encompassing operations 450, 452, 454, and 456, which indicates that these operations are performed for each neighboring gNB 170 identified in operation 420. Operation 450 is a loop encompassing 452, 454, and 456, indicating that these operations are performed as long as the specific neighboring gNB (determined by operation 440) is connected to a power grid or has a battery power level above a threshold value. At operation 452, gNB 110 transmits a message (here, ie_ml) to a specific UE of the identified UEs 120. The message includes a request to train a traffic model provided by gNB 110, and provide the trained traffic model to the gNB 110. In this example, the message further includes, the model to be trained (e.g., model type in the example of FIG. 4), and features and parameters related to the model to be trained (e.g., feature_space and budget (hyper_parameters) as illustrated in the example of FIG. 4). The feature_space can indicate features that the gNB 110 wants to learn from the identified gNBs 170 and that will be inputs to the traffic model.

At operation 454, the gNB 170 trains the traffic model in response to the message received in operation 452. At operation 456, the gNB 170 transmits the trained traffic model to the gNB 110. At operation 460, the gNB 110 averages each of the traffic models received from the gNBs 170 to generate a combined traffic model. At operation 470, the gNB 110 transmits the combined traffic model to the gNBs 170.

In some embodiments, after the operations in FIG. 4, the gNB 110 proceeds with enabling/disabling a DRX feature or adjusting transmission/reception power based on the combined traffic model.

In some embodiments, the combined traffic model is intended to predict uplink/downlink traffic, which can be viewed as either a classification problem or as a regression problem. As a classification problem, the combined traffic model would classify between different types of traffic, for example low, medium and high. In some examples, a receiver operating characteristic ("ROC") area under the curve ("AUC") score can be used in order to determine how well the combined traffic model predicts the different classes. A low ROC AUC score (e.g., 0) or a very high (e.g., 1.0) can be an indication of pathologies in the data or training process and as such may reduce trust in the prediction. In additional or alternative examples, this issue can be treated by simply retraining the model if a UE has collected more data.

As a regression problem, additional features such as past values of uplink/downlink traffic may be used to certify the combined traffic model is producing accurate predictions. For example, a collection of past of values within a time window (e.g., every hour for the past 48 hours) may be measured. Using this information, the fluctuation of traffic over time can be measured and used to make a more accurate prediction and a r squared score may be used to describe how well the combined traffic model performs.

In some embodiments, based on the UE usage of internal energy, the UE can determinate its own operation energy class. A UE energy pattern class usage is defined internally, and with a rather small operation machine learning model, based on usage of the UE. This "Energy class" can be transmitted and incorporated into the reference signaling, on which the UE will inform the radio network node about its operational condition. Informing the radio network node can allow the radio network node to activate corresponding network features. The energy pattern class is a "sort of identity" class of the UE, that can be used, for example, on handover, or changing within different cells, to set the radio network node and their by the Baseband ("BB") to schedule this information before activating/deactivating radio features.

In additional or alternative embodiments, the scheduler can incorporate this information on an empty slot or pre-allocation position in the scheduling procedure.

In some embodiments, a radio network node can collaborate with neighboring radio network nodes to produce a combined traffic model based on the input they receive from multiple UEs. FIG. 5 illustrates an example of a table with a listing of performance manager ("PM") counters that can be used in order to predict the amount traffic that will be received by each radio network node (or cell of a radio network node). All features may be recorded in an EUtranCellFDD Managed Object. This information can be aggregated for the purposes of operations support systems ("OSS") at 15-minute time intervals in local data centers. In some examples, this facilitates current deployments and older legacy generations. In additional or alternative examples, future generations can retrieve this information locally at each gNB instead.

In some embodiments, a radio network node can generate a combined traffic model based on decentralized learning that includes receiving traffic models from UEs within a coverage area of the radio network node and from neighboring radio network nodes. The hybrid approach can tag different UEs to retrain their associated traffic models when a major discrepancy is indicated between their corresponding prediction and neighboring radio network nodes.

Figure 6:
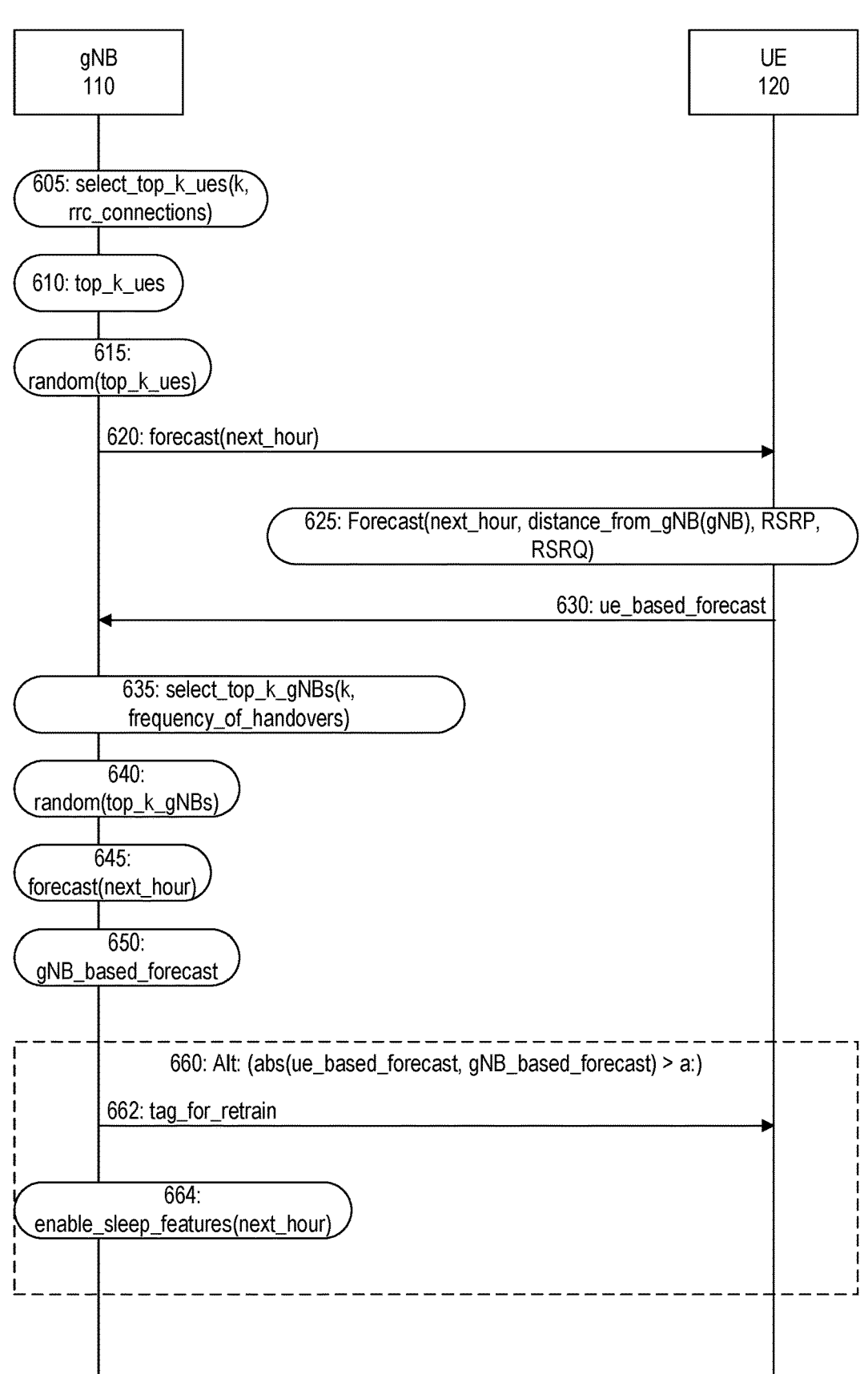
FIG. 6 is a signal flow diagram illustrating an example of a process using traffic models from multiple neighboring radio network nodes to determine UEs to tag for retraining associated traffic models in accordance with some embodiments.

FIG. 6 illustrates an example of a process performed by a gNB 110 for identifying UEs to request to retrain traffic models. At operations 605, 610, and 615, gNB 110 selects random UEs from a set of top UEs associated with the gNB 110. At operation 620, gNB 110 transmits a message to UE 120 requesting a traffic prediction for a specific time. In this example, the gNB 110 requests a traffic forecast for the next hour. At operation 625, UE 120 determines a prediction of the distance the UE will be from the gNB 110, the RSRP, and the RSRQ for the next hour and, at operation 630, the UE 120 transmits this forecast to the gNB 110.

At operations 635, 640, 645, and 650 the gNB 110 determines a traffic forecast for the next hour based on a traffic model from a random neighboring gNB.

Operation 660 is a loop encompassing operations 662 and 664, which indicates that the operations are performed in response to a difference between the UE forecast and the neighboring gNB forecast being above a threshold value. At operation 662, gNB 110 transmits a message to the UE 120 indicating that the UE 120 should retrain its traffic model. At operation 664, the gNB 110 enters a sleep state for a predetermined time. In this example, the gNB 110 enters the sleep state for the next hour.

Operations of a network node will now be discussed with reference to the flow charts of FIGS. 10-12 according to some embodiments of inventive concepts. FIGS. 10-12 will be described below as being performed by RAN node 800 (implemented using the structure of the block diagram of FIG. 8). For example, modules may be stored in memory 805 of FIG. 8, and these modules may provide instructions so that when the instructions of a module are executed by respective RAN processing circuitry 803, processing circuitry 803 performs respective operations of the flow charts.

FIG. 10 illustrates an example of a process performed by a radio network node to determine how to adjust power consumption of a telecommunications network based on decentralized traffic modeling.

At block 1050, processing circuitry 803 determines a traffic prediction representing how each node of a set of nodes interacts with the RAN node 800 using a combined traffic model. The combined traffic model is based on a traffic model of each node in the set of nodes. In some embodiments, each node in the set of nodes is a UE or a neighboring radio network node. In additional or alternative embodiments, determining the traffic prediction includes formulating patterns that include one or more of periods of inactivity of each node in the set of nodes and expected traffic at the RAN node 800.

In additional or alternative embodiments, the combined traffic model and/or the traffic model of each node in the set of nodes are machine learning models. Determining the traffic prediction can include determining the traffic prediction from the machine learning model based on an input to the machine learning model. The input to the machine learning model can include a location of each node in the set of nodes; a distance of each node in the set of nodes from the radio network node; a measured reference signal received power, RSRP; a measured reference signal received quality, RSRQ; a measured amount of bits per a time unit sent or received by each node in the set of nodes; and/or a signal to noise ratio, SNR.

At block 1060, processing circuitry 803 determines to enable or disable at least one power related feature of the RAN node 800 based on the traffic prediction. In some embodiments, enabling or disabling the at least one power related feature of the RAN node 800 includes enabling or disabling a power amplifier of the RAN node 800. In additional or alternative embodiments, enabling or disabling a power related feature includes a discontinuous reception, a reduction in transmission power, or a reduction in reception power. In additional or alternative embodiments, determining to enable or disable the power related feature of the RAN node 800 includes determining to change a state of the RAN node 800 based on comparing an output of the combined traffic model to a predetermined threshold value.

FIG. 11 illustrates another example of a process performed by a radio network node to determine how to adjust power consumption of a telecommunications network based on decentralized traffic modeling.

At block 1110, processing circuitry 803 determines a set of nodes. In some embodiments, each node in the set of nodes is a UE. In some examples, the set of nodes can include a portion of the UEs within a coverage area of the RAN node 800. Determining the set of nodes can include determining the portion of the UEs within the coverage area of the radio network node that most often connect to the radio network node. In alternative embodiments, each node in the set of nodes is a neighboring radio network node. In some examples, a neighboring radio network node can include another radio network node capable of performing a handover of a UE with the RAN node 800. Determining the set of nodes can include determining the portion of the neighboring radio network nodes that most often perform a handover of a UE with the RAN node 800. In additional or alternative embodiments, some nodes in the set of node are UEs and some nodes in the set of nodes are neighboring radio network nodes.

At block 1120, processing circuitry 803 transmits a request message to each node of the set of nodes. In some embodiments, each request message can request a traffic model be generated by the corresponding node and provided to the RAN node 800.

In some embodiments, request messages being transmitted to a UE in the set of nodes include an indication of a type of the traffic model to be generated by each node of the set of nodes. In some examples, the type of the traffic model is a specific machine learning module (e.g., a neural network) with a specific number of layers.

In additional or alternative embodiments, request messages being transmitted to a UE in the set of nodes include an indication of at least one communication feature (sometimes referred to as feature-space) to be measured and modeled by the traffic model. For example, the communication feature can include a location of each node in the set of nodes; a distance of each node in the set of nodes from the radio network node; a measured reference signal received power, RSRP; a measured reference signal received quality, RSRQ; a measured amount of bits per a time unit sent or received by each node in the set of nodes; and/or a signal to noise ratio, SNR.

In additional or alternative embodiments, request messages being transmitted to a UE in the set of nodes include an indication of a budget and/or an amount of resources to be allocated by each UE to train the traffic model. In some examples the budget can include an amount of time, processing power, or battery power to use in training the traffic model. In additional or alternative examples, the budget can include a threshold battery power such that the node can only train the traffic model while its battery power is above the threshold battery power.

In additional or alternative embodiments, request messages being transmitted to a UE in the set of nodes include a request that each UE of the set of nodes determine its power class. In some examples, the request message indicates the power class should be used to generate the traffic model. In additional or alternative examples, the request message indicates that the power class should be provided to the RAN node 800 to be used in generating the combined traffic model.

In additional or alternative embodiments, request messages being transmitted to a neighboring radio network node in the set of nodes include an indication of a type of the traffic model and/or an indication that the traffic model predict uplink and/or downlink traffic at the RAN node 800 originating from the neighboring radio network nodes.

At block 1130, processing circuitry 803 receives, via transceiver 801, a response message from each node of the set of nodes. In some embodiments, each response message may be received in response to transmitting a corresponding request message.

At block 1140, processing circuitry 803 generates combined traffic model based on the traffic model from each node of the set of nodes. In some embodiments, generating the combined traffic model includes averaging the traffic model from each model of the set of nodes.

Blocks 1050 and 1060 are the same as in FIG. 10 and include processing circuitry 803 determining a traffic prediction by using the combined traffic model and determining to enable or disable at least one power related feature of the radio network node based on the traffic prediction. In some embodiments, At block 1170, processing circuitry 803 causes the state of the radio network node to transition between an active state and a sleep state. In some embodiments, in response to a prediction of low traffic, processing circuitry 803 may cause a power amplifier, connected cell, or the entire RAN node 800 to enter a microsleep state.

FIG. 12 illustrates an example of an additional or alternative process performed by the radio network node to improve traffic models associated with specific communication devices/UEs included in the set of nodes. At block 1210, processing circuitry 803 determines that a portion of the traffic prediction associated with a communication device is different than an output of a traffic model generated by the communication device. At block 1220, processing circuitry 803 transmits, via transceiver 801, a retrain message to the communication device. In some embodiments, the retrain message is transmitted to the communication device in response to determining that the portion of the traffic prediction associated with the communication device is more than a threshold value different than the output of the traffic model generated by the communication device.

In some embodiments, the operations in FIGS. 10-12 are performed by a gNodeB and the telecommunications network is a new radio, NR, network. In additional or alternative embodiments, the operations in FIGS. 10-12 are performed by a eNodeB and the telecommunication network is a long-term evolution, LTE, network.

Various operations of FIGS. 10-12 may be optional with respect to some embodiments of network nodes and related methods. For example, operations of blocks 1110, 1120, 1130, 1140, and 1170 of FIG. 11 and blocks 1210 and 1220 of FIG. 12 may be optional with respect to independent claims regarding network nodes.

Figure 13:
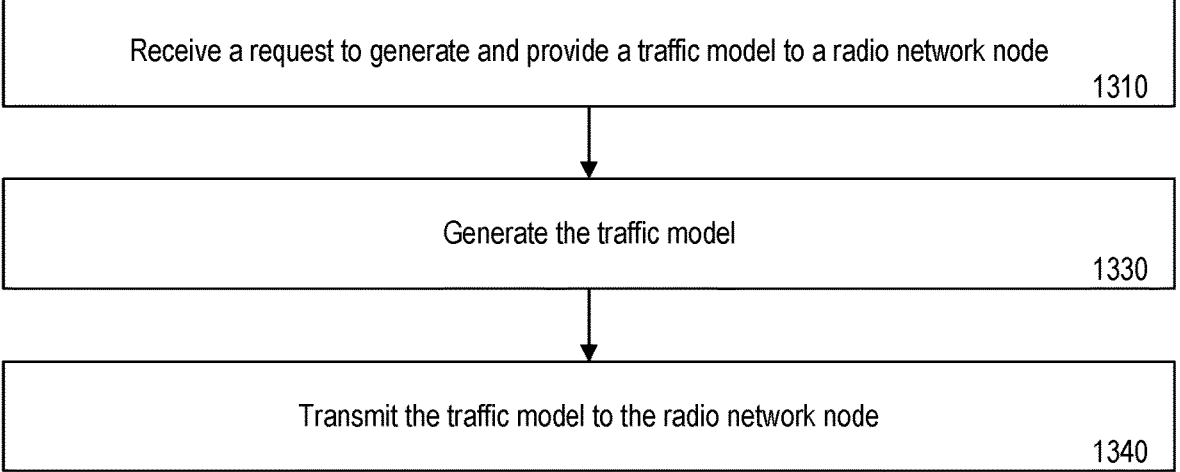
FIGS. 13-14 are flow charts illustrating examples of processes performed by a communication device in accordance with some embodiments.
Figure 14:
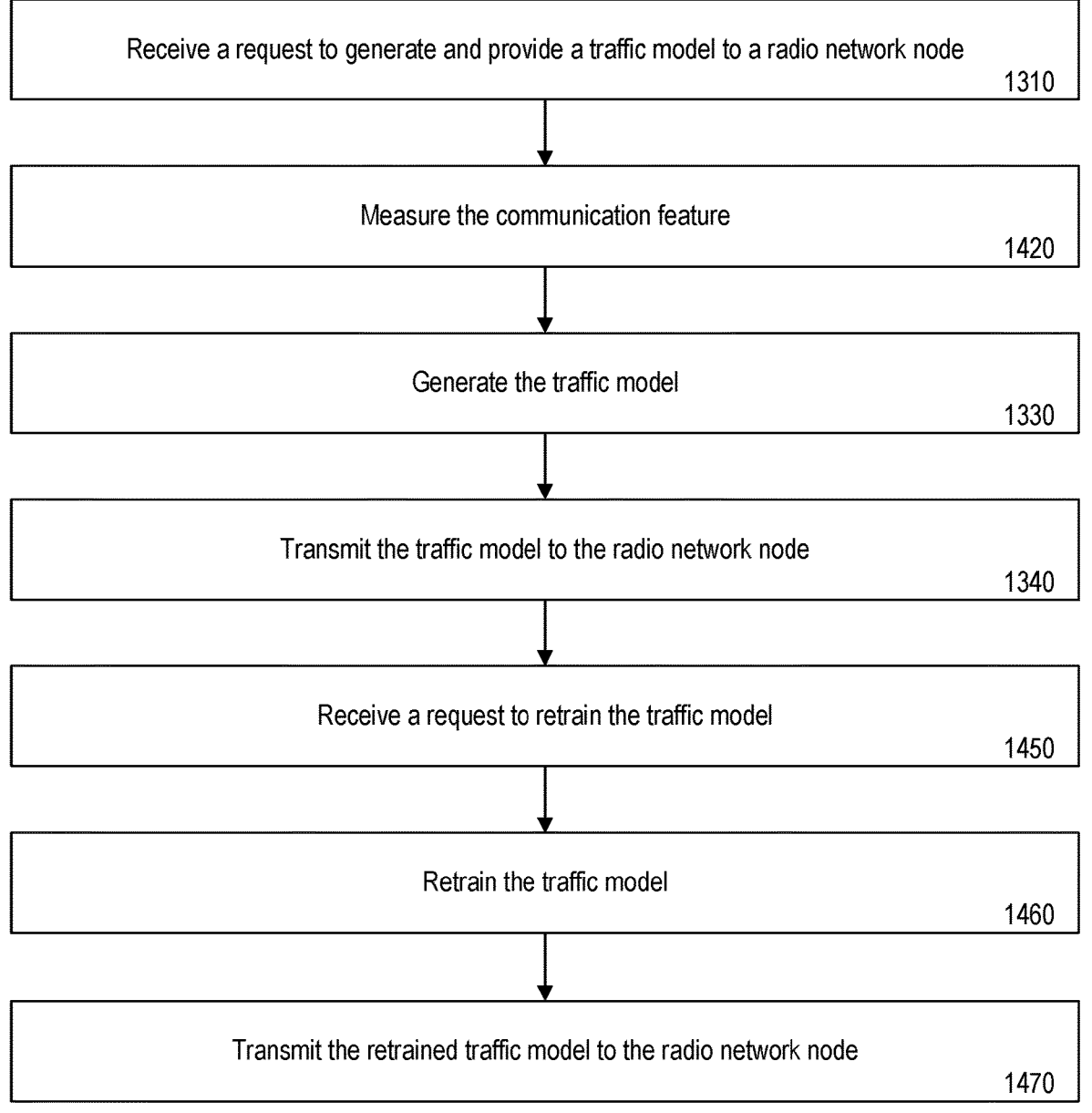

Operations of a communication device will now be discussed with reference to the flow charts of FIGS. 13-14 according to some embodiments of inventive concepts. FIGS. 13-14 will be described below as being performed by communication device 700 (implemented using the structure of the block diagram of FIG. 7). For example, modules may be stored in memory 705 of FIG. 7, and these modules may provide instructions so that when the instructions of a module are executed by respective communication device processing circuitry 703, processing circuitry 703 performs respective operations of the flow charts.

FIG. 13 illustrates examples of operations performed by a communication device. At block 1310, processing circuitry 703 receives, via transceiver 701, a request to generate and provide a traffic model to a radio network node (e.g., RAN node 800). In some embodiments, the request message includes an indication of a type of the traffic model, an indication of at least one communication feature to be measured and modeled, and/or an amount of resources to be allocated by the communication device to generate the traffic model. In additional or alternative embodiments, the request message includes the amount of resources to be allotted by the communication device to generate the traffic model, which can include at least one of: an amount of time to generate the traffic model, an amount of resources to use to generate the traffic model, and a threshold battery level at which to stop generating the traffic model.

At block 1330, processing circuitry 703, generates the traffic model. At block 1340, processing circuitry 703, transmits, via transceiver 701, the traffic model to the radio network node.

FIG. 14 illustrates examples of additional operations performed by the communication device. At block 1310 (similar to block 1310 in FIG. 13), processing circuitry 703 receives, via transceiver 701, a request to generate and provide a traffic model to a radio network device. At block 1420, processing circuitry 703, measures the communication feature. In some embodiments, the communication feature includes at least one of: a location of the communication device; a distance of the communication device from the radio network node; a measured reference signal received power, RSRP; a measured reference signal received quality, RSRQ; a measured amount of bits per a time unit transmitted or received by the communication device; and a signal to noise ratio, SNR. In additional or alternative embodiments, the communication feature includes a power class of the communication device.

At blocks 1330 and 1340 (similar to blocks 1330 and 1340 in FIG. 13), processing circuitry 703 generates the traffic model and transmits the traffic model to the radio network node. In some embodiments, the traffic model is a machine learning model and generating the traffic model includes training the machine learning model based on the communication feature.

At block 1450, processing circuitry 703 receives, via transceiver 701, a request to retrain the traffic model. At block 1460, processing circuitry 703 retrains the traffic model. In some embodiments, retraining the traffic model includes generating a new traffic model based on newly measured communication features. At block 1470, processing circuitry 703 transmits, via transceiver 701, the retrained traffic model to the radio network node.

In some embodiments, the radio network node is next generation base station or gNodeB and the telecommunications network is a new radio, NR, network. In additional or alternative embodiments, the radio network node is a LTE base station or eNodeB and the telecommunication network is a LTE network.

Various operations of FIGS. 13-14 may be optional with respect to some embodiments of communication devices and related methods. For example, operations of blocks 1420, 1450, 1460, and 1470 of FIG. 14 may be optional with respect to independent claims regarding communication devices Explanations for abbreviations from the above disclosure are provided below.

| Abbreviation | Explanation |
| --- | --- |
| 3GPP | 3rd Generation Partnership Project |
| 5G | 5th Generation |
| CQI | Channel Quality information |
| DRX | Discontinuous Reception |
| eNB | E-UTRAN NodeB |
| E-UTRAN | Evolved UTRAN |
| gNB | Base station in NR |
| LSTM | Long Short Term Memory |
| LTE | Long-Term Evolution |
| NR | New Radio |
| OSS | Operating and Support System |
| PM | Performance Manager |
| RAN | Radio Access Network |
| RAT | Radio Access Technology |
| RBS | Radio Base Station |
| RRC | Radio Resource Control |
| RSRP | Reference Signal Received Power |
| RSRQ | Reference Signal Received Quality |
| RSSI | Received Signal Strength Indicator |
| SNR | Signal to Noise Ratio |
| UE | User Equipment |
| UTRAN | Universal Terrestrial Radio Access Network |
| WIFI | Wireless Fidelity |

Additional Explanation is Provided Below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a radio network node to adjust power consumption of a telecommunications network, the method comprising:

determining a traffic prediction representing how each node of a set of nodes will interact with the radio network node over a period of time using a combined traffic model based on a traffic model of each node in the set of nodes, wherein the set of nodes comprises a portion of communication devices within a coverage area of the radio network node, and wherein determining the traffic prediction comprises formulating patterns that include one or more periods of inactivity of each node in the set of nodes and expected traffic at the radio network node; and determining to enable or disable at least one power related feature of the radio network node based on the traffic prediction.

2. The method of claim 1, further comprising:

determining that a portion of the traffic prediction associated with a communication device is more than a threshold value different than an output of a traffic model generated by the communication device of the set of nodes; and responsive to determining that the traffic prediction is more than a threshold value different than the output of the traffic model associated with the communication device, transmitting a retrain message to the communication device requesting the communication device retrain the traffic model associated with the communication device.

3. The method of claim 1, wherein the at least one power related feature comprises at least one of:

a discontinuous reception;

a reduction in transmission power; and a reduction in reception power.

4. The method of claim 1, wherein the traffic model comprises a machine learning model, wherein determining the traffic prediction comprises determining the traffic prediction from the machine learning model based on an input to the machine learning model, and wherein the input comprises one or more of:

a location of each node in the set of nodes;

a distance of each node in the set of nodes from the radio network node;

a measured reference signal received power (RSRP);

a measured reference signal received quality (RSRQ);

a measured amount of bits per a time unit sent or received by each node in the set of nodes; or a signal to noise ratio (SNR).

5. The method of claim 1, wherein determining the traffic prediction comprises generating the combined traffic model by averaging the traffic models of each node.

6. The method of claim 1, further comprising:

determining the set of nodes based on the communication devices that most often connect to the radio network node;

transmitting a request message to each node of the set of nodes, each request message requesting the traffic model be generated and provided to the radio network node;

responsive to transmitting the request message to each node of the set of nodes, receiving a response message from each node of the set of nodes, each response message including the traffic model; and responsive to receiving the response message from each node of the set of nodes, generating the combined traffic model based on the traffic model from each node of the set of nodes, wherein the request message comprises an indication of a type of the traffic model, an indication of at least one communication feature to be measured and modeled, and/or an amount of resources to be allocated by each node of the set of nodes to train the traffic model.

7. The method of claim 6, wherein the request message comprises an indication that each communication device in the set of nodes determines its power class and generates the traffic model based on the power class.

8. The method of claim 6, wherein the request message comprises the amount of resources to be allocated by each communication device in the set of nodes to train the traffic model, which includes at least one of: an amount of time to generate the traffic model; an amount of resources to use to generate the traffic model; and a threshold battery level at which to stop generating the traffic model.

9. The method of claim 1, wherein determining to enable or disable comprises determining to change a state of the radio network node based on comparing an output of the combined traffic model to a predetermined threshold value, the method further comprising:

responsive to determining to enable or disable, causing the state of the radio network node to transition between an active state and a sleep state.

10. The method of claim 1, wherein the radio network node is a next generation base station (gNB) and the telecommunications network is a new radio (NR) network.

11. The method of claim 1, wherein the set of nodes further comprises a portion of neighboring radio network nodes of the radio network node, the method further comprising:

determining the set of nodes based on the neighboring radio network nodes that most often perform handovers with the radio network node, wherein a request message transmitted to each neighboring radio network node of the set of nodes comprises an indication of a type of the traffic model and/or an indication that the traffic model predicts uplink and/or downlink traffic at the radio network node originating from the neighboring radio network nodes.

12. A radio network node in a telecommunications network, the radio network node comprising:

processing circuitry; and memory coupled with the processing circuitry, wherein the memory includes instructions that when executed by the processing circuitry causes the radio network node to perform operations to adjust power consumption of the telecommunications network, the operations comprising:

determining a traffic prediction representing how each node of a set of nodes will interact with the radio network node over a period of time using a combined traffic model based on a traffic model of each node in the set of nodes, wherein the set of nodes comprises a portion of communication devices within a coverage area of the radio network node, and wherein determining the traffic prediction comprises formulating patterns that include one or more periods of inactivity of each node in the set of nodes and expected traffic at the radio network node; and determining to enable or disable at least one power related feature of the radio network node based on the traffic prediction.

13. The radio network node of claim 12, wherein the at least one power related feature comprises at least one of:

a discontinuous reception;

a reduction in transmission power; and a reduction in reception power, wherein the traffic model comprises a machine learning model, wherein determining the traffic prediction comprises determining the traffic prediction from the machine learning model based on an input to the machine learning model, and wherein the input comprises one or more of:

a location of each node in the set of nodes;

a distance of each node in the set of nodes from the radio network node;

a measured reference signal received power (RSRP);

a measured reference signal received quality (RSRQ);

a measured amount of bits per a time unit sent or received by each node in the set of nodes; or a signal to noise ratio (SNR).

14. A method of operating a communication device in a telecommunication network to adjust power consumption of the telecommunications network, the method comprising:

receiving, a request message from a radio network node operating in the telecommunication network, the request message requesting the communication device generate and provide a traffic model to the radio network node, wherein the request message further comprises an indication of a type of the traffic model and an indication of at least one communication feature to be measured and modeled, wherein the type of the traffic model comprises a machine learning model;

responsive to receiving the request message, generating the traffic model, wherein generating the traffic model comprises measuring the at least one communication feature and training the machine learning model based on the at least one communication feature; and responsive to generating the traffic model, transmitting a response message to the radio network node, the response message including the traffic model.

15. The method of claim 14, wherein the request message further comprises an amount of resources to be allocated by the communication device to generate the traffic model, wherein the at least one communication feature comprises one or more of:

a power class of the communication device;

a location of the communication device;

a distance of the communication device from the radio network node;

a measured reference signal received power (RSRP);

a measured reference signal received quality (RSRQ);

a measured amount of bits per a time unit transmitted or received by the communication device; or a signal to noise ratio (SNR), and wherein the request message comprises the amount of resources to be allocated by the communication device to generate the traffic model, which includes at least one of: an amount of time to generate the traffic model, an amount of resources to use to generate the traffic model, and a threshold battery level at which to stop generating the traffic model.

16. The method of claim 14, further comprising:

receiving a third message from the radio network node, the third message requesting that the communication device retrain the traffic model;

responsive to receiving the third message, generating a new traffic model; and responsive to retraining the traffic model, transmitting a fourth message to the radio network node including the new traffic model.

17. The method of claim 14, wherein the radio network node is a next generation base station (gNB) and the telecommunications network is a new radio, NR, network.

18. A communication device in a telecommunications network, the communication device comprising:

processing circuitry; and memory coupled with the processing circuitry, wherein the memory includes instructions that when executed by the processing circuitry causes the communication device to perform operations to adjust power consumption of the telecommunications network, the operations comprising:

receiving, a request message from a radio network node operating in the telecommunication network, the request message requesting the communication device generate and provide a traffic model to the radio network node, wherein the request message further comprises an indication of a type of the traffic model and an indication of at least one communication feature to be measured and modeled, wherein the type of the traffic model comprises a machine learning model;

responsive to receiving the request message, generating the traffic model, wherein generating the traffic model comprises measuring the at least one communication feature and training the machine learning model based on the at least one communication feature; and responsive to generating the traffic model, transmitting a response message to the radio network node, the response message including the traffic model.

19. The communication device of claim 18, wherein the request message further comprises an amount of resources to be allocated by the communication device to generate the traffic model, wherein the at least one communication feature comprises one or more of:

a power class of the communication device;

a location of the communication device;

a distance of the communication device from the radio network node;

a measured reference signal received power (RSRP);

a measured reference signal received quality (RSRQ);

a measured amount of bits per a time unit transmitted or received by the communication device; or a signal to noise ratio (SNR), and wherein the request message comprises the amount of resources to be allocated by the communication device to generate the traffic model, which includes at least one of: an amount of time to generate the traffic model, an amount of resources to use to generate the traffic model, and a threshold battery level at which to stop generating the traffic model.

* * * * *